United States Patent [19]

Beddoe

[11] 3,851,639
[45] Dec. 3, 1974

[54] PORTABLE COMBINATION COOKING APPARATUS AND METHOD

[76] Inventor: Justin M. Beddoe, P.O. Box 744, Bellevue, Wash. 98004

[22] Filed: Feb. 26, 1973

[21] Appl. No.: 335,803

Related U.S. Application Data

[63] Continuation-in-part of Ser. No. 84,819, Oct. 28, 1970, abandoned.

[52] U.S. Cl. ............................................. 126/25 R
[51] Int. Cl. ......................... A47j 37/00, F24b 3/00
[58] Field of Search ...... 126/25 R, 25 A, 25 B, 9 R; 110/1 F

[56] References Cited
UNITED STATES PATENTS

| 925,911 | 6/1909 | Huyser | 126/25 R |
|---|---|---|---|
| 2,221,098 | 11/1940 | Langsam | 126/25 R |
| 2,237,081 | 4/1941 | Owens | 126/25 R |
| 3,027,887 | 4/1962 | Krohncke | 126/25 R |
| 3,224,357 | 12/1965 | Rubens | 126/25 R |
| 3,368,544 | 2/1968 | Duncan | 126/25 B |
| 3,581,731 | 6/1971 | Schulze | 126/25 R |

Primary Examiner—William F. O'Dea
Assistant Examiner—Harold Joyce
Attorney, Agent, or Firm—Cole & Jensen

[57] ABSTRACT

A portable combination cooking apparatus for grilling, charcoal broiling, rotisserie broiling, smoking, baking and warming, the apparatus comprising:

a. an upright cylindrical paper-burning housing having substantially closed bottom and sidewalls with adjustable vents at the upper sidewall portion and an open top;

b. a grill and charcoal broiling assembly adapted to fit over the top opening of the paper-burning housing, and comprising a wire grill, a charcoal carrying basket below the grill, and a convertible pan-cover;

c. an upper hood assembly for rotisserie broiling and smoking, the hood having a rotisserie mounting, a removable smoke shelf and an access door; and d. an oven base on which the paper-burning housing rests and being heated from the paper-burning chamber, the oven having a slide mounted adjustable access door.

17 Claims, 7 Drawing Figures

| | PAPER BURNING HOUSING (10) | ADJUSTABLE VENT SLOTS (34-38) | GRILL (60) | CHARCOAL BASKET (58) | COVER (62) | HOOD ASSEMBLY (16) | OVEN (12) |
|---|---|---|---|---|---|---|---|
| FOIL GRILLING | MAIN HEAT SOURCE | COMBUSTION CONTROL FULL—½ OPEN | FOOD SUPPORT COMBUSTION CONTROL | | | | OPTIONAL BAKING WARMING |
| PAN GRILLING | MAIN HEAT SOURCE | COMBUSTION CONTROL FULL—½ OPEN | | | FOOD SUPPORT COMBUSTION CONTROL | | OPTIONAL BAKING WARMING |
| BAKING | MAIN HEAT SOURCE | COMBUSTION CONTROL FULL—½ OPEN | | | COMBUSTION CONTROL | | COOKING CHAMBER |
| WARMING OVEN | MAIN HEAT SOURCE | COMBUSTION CONTROL FULL—½ OPEN | | | COMBUSTION CONTROL | | WARMING CHAMBER |
| CHARCOAL BROIL | IGNITOR CLOSED BASE | COMBUSTION CONTROL THEN CLOSED | FOOD SUPPORT | MAIN HEAT SOURCE | | | |
| ROTISSERIE BROIL | IGNITOR CLOSED BASE | COMBUSTION CONTROL THEN CLOSED | | MAIN HEAT SOURCE | | FOOD SUPPORT | |
| SMOKING | IGNITOR CLOSED SMOKE CHAMBER | COMBUSTION CONTROL THEN RESTRICTED AIR FLOW | SUPPORT WOOD CHIPS | MAIN HEAT SOURCE | | FOOD SUPPORT CLOSED SMOKE CHAMBER | |

PORTABLE COMBINATION COOKING APPARATUS AND METHOD

CROSS REFERENCE TO RELATED APPLICATION

This is a Continuation-in-Part application of my co-pending U.S. Pat. application, Ser. No. 84,819 and now abandoned, filed Oct. 28, 1970, entitled, "Combination Grill, Charcoal Broiler and Thermal Container."

BACKGROUND OF THE INVENTION

1. Field of the Invention

This invention relates generally to a portable outdoor combination cooking unit, adapted for grilling, charcoal broiling and rotisserie cooking, smoking, baking and warming.

2. Description of the Prior Art

There are in the prior art various devices which perform certain individual cooking functions.

For example, there are charcoal broiling devices such as shown in U.S. Pat. No. 2,791,659, issued to J. J. Pirz, and U.S. Pat. No. 2,898,845, to E. M. Dight. These show a charcoal broiler which can be used for grill charcoal broiling or rotisserie charcoal broiling.

Also, various hood arrangements are shown. U.S. Pat. No. 2,786,463 illustrates a cooking apparatus where there is a lower fuel supporting grate, an upper food supporting grate and a hood to cover the food supporting grate so as to control the rate of combustion of the fuel.

There is also in the prior art several devices where paper (such as crumpled up newspapers) can be used for cooking. For example, U.S. Pat. No. 3,046,969 shows a paper-burning container having an open top with a removable grate thereon. Crumpled paper is placed in the bottom of the container, and there are vent holes in the bottom and lower sidewalls of the container to provide air for burning of the paper. There is also in the prior art a device similar to that shown in U.S. Pat. No. 3,046,969, wherein there is a rectangular box-like container defining a paper-burning chamber. At the upper open end of the container is a grill to support food to be cooked. Slightly below the upper rim of the container are one or more lateral ventilating slots which permit air to travel into the paper-burning chamber to support combustion of the paper. To grill food with this apparatus, the chamber is filled with a number of crumpled up newspapers or other paper, which is then ignited (e.g., with a match). A metal foil cover is placed over the grill to substantially close the container top opening and the food to be cooked is placed on the metal foil cover. As the paper burns in the container, heat is delivered quickly to the food on the grill and it soon becomes cooked.

Also, U.S. Pat. No. 3,368,544, to R. W. Duncan, shows a charcoal broiler, wherein paper is used to ignite the charcoal briquettes used for broiling. In this device there is a paper-burning container having a completely perforate bottom for ventilation. At the upper end of the container is an imperforate pan to contain charcoal briquettes and a perforate grate, which pan and grate are connected by a central screw. The charcoal briquettes are enclosed between the grate and pan. To ignite the briquettes, the briquette-containing assembly is turned upside down (i.e., with the grate down) until the burning paper lights the briquettes. Then the briquette-containing assembly is inverted so that the imperforate pan is lowermost to support the briquettes and the device is used in a conventional manner for charcoal broiling. However, this apparatus is not arranged for using the crumpled paper itself as a heat source for cooking (e.g., grilling, baking, warming), because of the lack of provision for controlled combustion of the burning paper.

While such devices as those cited above work satisfactorily for the intended purpose, they are not adapted for a multiplicity of cooking operations.

SUMMARY OF THE INVENTION

In the present invention there is a portable combination cooking apparatus which can be utilized as a paperburning grill (either pan or foil grilling), a grill charcoal broiler, a rotisserie charcoal broiler, a smoker, a baking oven, a warming oven and combinations of the above.

The invention comprises a paper-burning housing having substantially closed bottom and sidewalls and adjustable vents at the upper sidewall portions. For paper grilling this housing serves as a chamber in which crumpled newspaper can be burned as the main heat source for the grilling. For baking or warming of food in an oven disposed below, this housing provides the heating chamber for such oven. For charcoal broiling and smoking, it serves as an igniter.

At the upper portion of the paper-burning housing are a pair of slot-like ventilating openings arranged to provide air for proper rate of combustion of paper in the housing. An adjustable closure door is provided for each opening for proper control of these vent openings for the various cooking operations.

Removably mounted to the open top of the paper-burning housing is a grill and charcoal broiling assembly, comprising a perforate wire grate below which is a charcoal briquette containing basket. A removable cover fits over the top housing opening. This cover can serve as a cooking pan, and in addition to being a protective cover, it serves in combination with the housing side vents, to control combustion of the paper in the housing when the apparatus is being used as an oven.

There is also an upper hood assembly adapted to fit on the top part of the paper-burning housing. This hood has an open front, and means for a rotisserie to be mounted therein. When the apparatus is to be used as a smoker, a removable door is used to completely enclose the top portion of the housing, and a smoke shelf is placed in the hood to support the food to be smoked. Controlled burning of the fuel is accomplished by adjusting the side vents in the upper portion of the housing for limited air circulation.

The base of the apparatus is formed as an oven with an adjustable sliding door. The top of the base (which forms the floor of the housing) is a heat-conductive metal plate so that heat is supplied to the oven by burning paper in the housing above. By closing the oven door, the oven can be used for baking. By opening the oven door a desired amount, the oven can be used for warming at a lower temperature.

DESCRIPTION OF THE PREFERRED EMBODIMENTS

1. Apparatus of the Invention

The apparatus of the present invention has four main components: a paper-burning housing 10, an oven base 12 on which the housing 10 rests, a grill, broiler and cover assembly 14 mounted to the top part of the housing 10, and a rotisserie and smoking hood assembly 16 mounted above the housing 10.

The housing 10 has a generally cylindrical configuration with an open top at 18. It comprises an outer cylindrical metallic sidewall 20, an inner cylindrical metallic sidewall 22 located concentrically therein, and an intermediate cylindrical asbestos sidewall 24 fitting between the walls 20 and 22. The upper circular edge of the housing 10 is closed by a circular U-shaped rim member 26 crimped onto the upper edge of the outer wall 20, as at 28. The lower portion of the outer sidewall 20 is formed with a plurality of inwardly extending tabs 30 to support a circular metallic floor 32 which closes the bottom of the housing 10. Thus, the inner sidewall 22 with the bottom 32 define a paper-burning combustion chamber 33 with substantially closed side and bottom walls and an open top. A removable thermally insulated chest can be mounted in the chamber 33 for storing food.

A moderate distance below the upper peripheral rim 26 of the housing 10 are two arcuate horizontal laterally extending diametrically opposed through-ventilating slots 34. Mounted in each slot 34 on a slideway 36 is a respective one of two adjusting doors 38, each of which has an operating tab 40. Each door 38 is slide mounted so that it can independently be moved in one direction to completely open its related slot 34, moved in the opposite direction to completely close its slot 34, or be moved to an intermediate position. As will be disclosed more fully hereinafter, these adjustable slots 34 provide for controlled burning of the paper fuel in the chamber 33. The outer metallic sidewall 20 is provided with a plurality of ventilating holes 42 for cooling of the outer sidewall 20.

Figure 1:
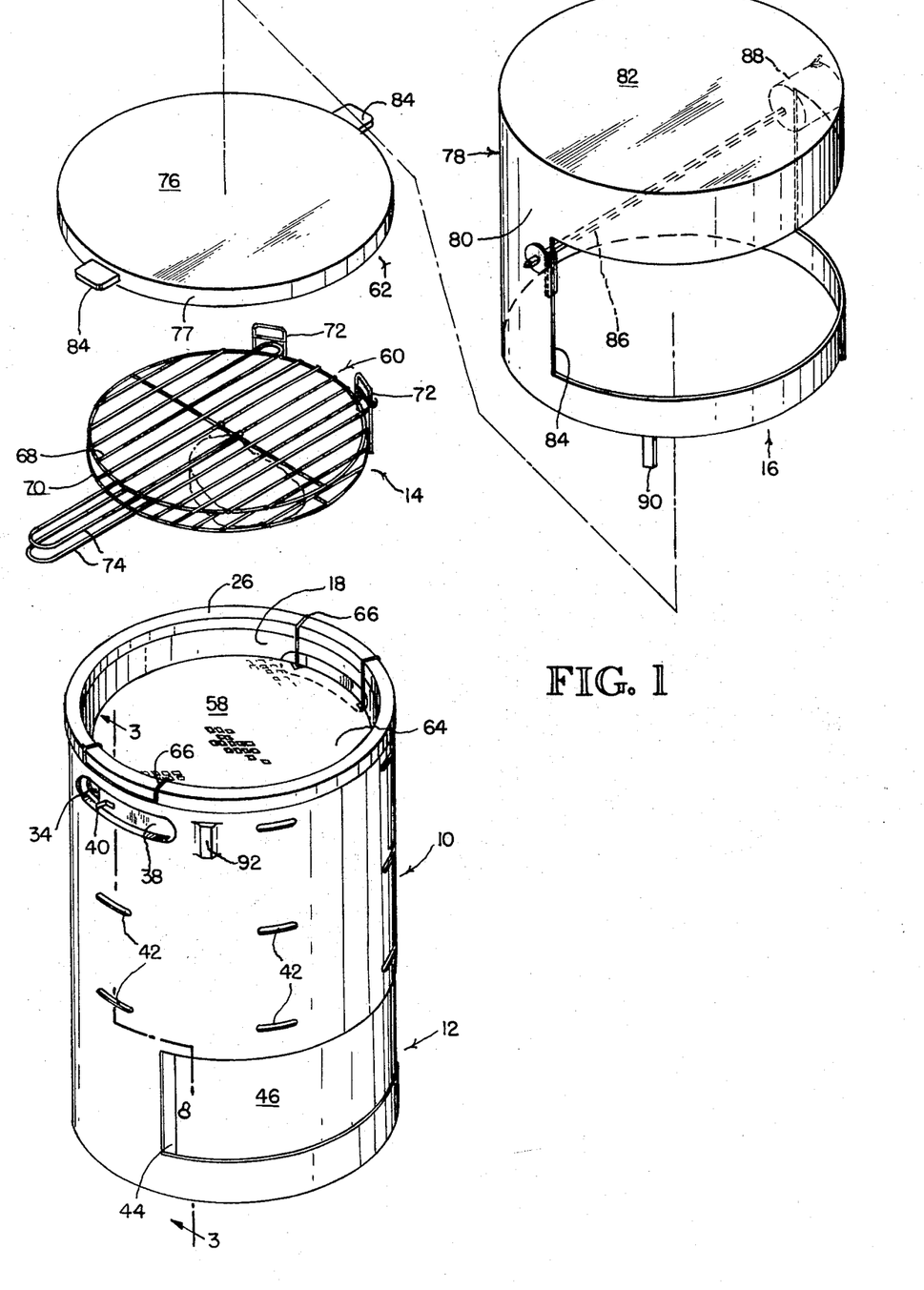
FIG. 1 is an exploded view of a first embodiment of the apparatus of the present invention.
Figure 2:
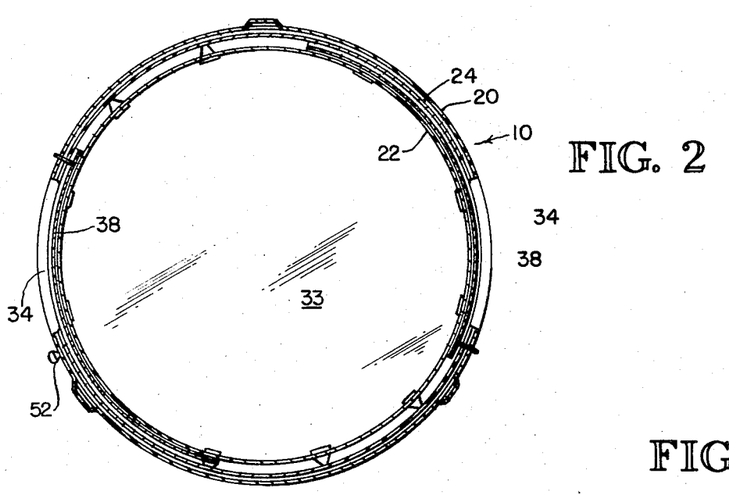
FIG. 2 is a horizontal sectional view taken along line 2—2 of FIG. 3.
Figure 3:
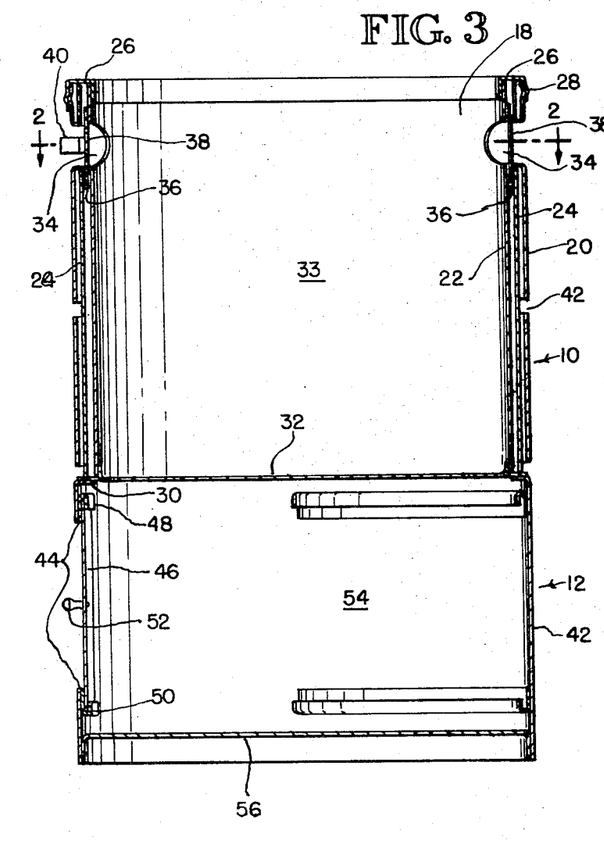
FIG. 3 is a vertical sectional view taken along line 3—3 of FIG. 1.

The oven base 12 has a generally upright cylindrical configuration, and is shown in the first embodiment of FIGS. 1 through 3 as an integral downward extension 12 of the outer sidewall 20 of the housing 10. The oven sidewall 42 has an access opening 44 closed by a sliding door 46 mounted in upper and lower slideways 48 and 50 mounted inside the sidewall 42. The door 46 has an operating knob 52 by which the door can be moved to leave the oven opening 44 completely open, completely closed, or partially open to obtain intermediate temperatures in the oven. The oven interior 54 serves either as a baking or warming chamber depending upon the amount of paper burned in the burning chamber 33 and the degree the oven opening 44 is left open. The floor 56 of the oven is connected to the oven sidewall 42 at the lower edge thereof.

Figure 4:
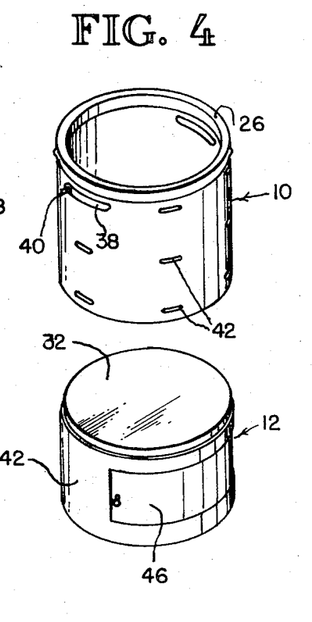
FIG. 4 is a perspective view of a second embodiment where the paper-burning housing and the oven base are made as separate components.

FIG. 4 shows a modified form of the embodiment of FIGS. 1 through 3, wherein the housing 10 and oven 12 are made as two separate components for easier storage and handling of the apparatus.

The aforementioned grilling and broiling assembly 14 comprises a charcoal briquette containing basket 58, a wire grill 60 and a convertible pan-cover 62. The briquette containing basket 58 is made of wire mesh and is formed as a shallow cylinder to fit within the upper housing opening 18 of the housing 10 so as to substantially cover the opening 18. The basket 58 has a circular bottom 64 and is supported by two brackets 66, which reach over the housing rim 26 so as to support the basket 58 in the housing opening 18. The mesh of the basket 58 has perforations sufficiently large to permit flame from the paper-burning chamber 33 to pass through the perforations and ignite charcoal briquettes in the basket 58, but the mesh is sufficiently small so that it will contain the burning charcoal briquettes without permitting them to drop into the housing 10 until they have burned down to a substantially smaller size.

The location of the basket 58 relative to the ventilating slots 34 is significant. First, for a properly controlled burning of paper in the chamber 33, the slots 34 themselves should be only a moderate distance below the housing rim 26, and properly sized and adjusted to control the amount of air passing into the chamber 33. It has been found that with the basket 58 so arranged that the bottom 64 of the basket 58 is above the bottom edge of the slots 34, and preferably no further up than about half the vertical dimension of the through-ventilating slots 34, there is sufficient ventilation through the slots 34 to produce enough flame in the chamber 33 to quickly ignite charcoal briquettes in the basket 58. Further, the bottom 64 of the basket 58 should be below the rim 26 a sufficient distance (e.g., 2 to 3 inches) so that there is sufficient depth for an adequate amount of charcoal briquettes to be carried in the basket 58.

The grill 60 comprises upper and lower wire mesh grates 68 and 70, respectively, pivotally joined to one another at 72 and provided with respective retractable handles 74. This grill is adapted to be mounted at the location of the upper rim 26 of the housing 10 and above the basket 58.

The convertible pan-cover 62 comprises a circular plate 76 having a peripheral rim 77 and two diametrically opposed handles 81. The diameter of the plate 76 is moderately larger than the diameter of the housing outer sidewall 20, so that in functioning as a cover, the rim 77 will fit around the upper rim 26 of the housing 10.

The hood rotisserie broiling and smoking assembly 16 comprises a hood member 78 comprising a sidewall 80 and a circular top wall 82. The side 80 is cut away to provide an access opening 84 to permit insertion of food into the area within the hood 78. A rotisserie 86 with an electric motor 88 is mounted to the hood at about the mid-height thereof. At the lower edge of the hood 78 are several downwardly extending mounting fingers 90 which fit into mating slots 92 formed in the upper outer sidewall 20 of the housing 10 so that the hood 78 can be mounted thereto.

Figures 5, 6:
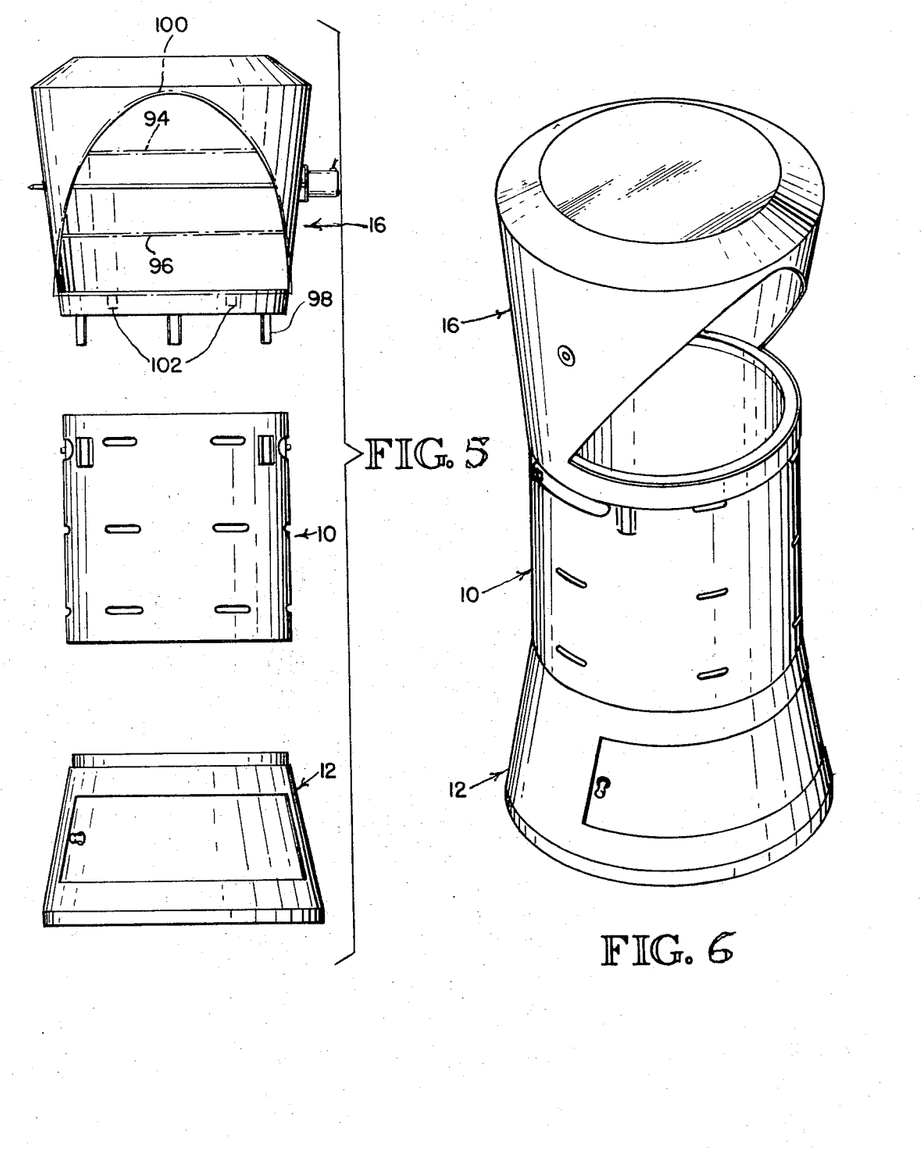
FIG. 5 is an exploded view of a second embodiment of the present invention.
FIG. 6 is an isometric view of the apparatus of FIG. 5 shown assembled.

The adaption of the hood assembly 16 for smoking of food is illustrated in the third embodiment shown in FIGS. 5 and 6. In this embodiment, the apparatus is substantially the same as that of the first embodiment shown in FIGS. 1 through 3, except that the oven base 12 is expanded outwardly and downwardly in frustoconical fashion, and the upper portion of the hood assembly 16 is expanded outwardly to a moderate extent, as an inverted truncated cone. With reference to FIG. 5, in the upper portion of the hood member 78' there are mounted upper and lower wire mesh food racks 94 and 96, respectively. Also a removable front cover 98 is provided to cover the access opening 84. This cover 98 is secured by a top latch 100, and two downwardly extending mounting tabs 102 at the lower edge of the cover 98.

2. Operation of the Invention

Figure 7:
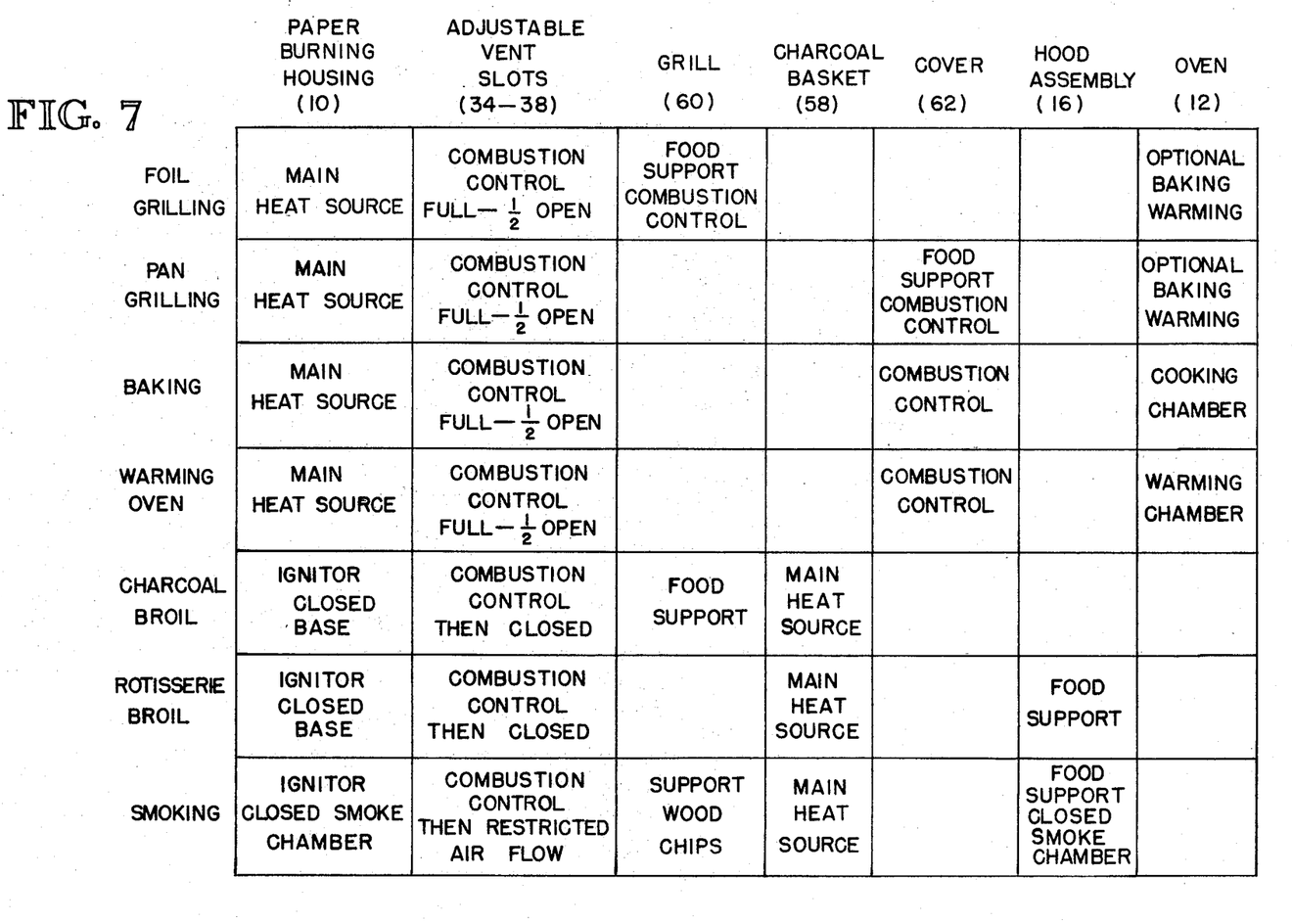
FIG. 7 is a chart cross-coordinating the main physical components of the present invention with the major functions of the present invention and showing which components cooperate to accomplish such functions.

To describe the operation of the present invention, reference is made to FIG. 7 of the accompanying drawings. As indicated in FIG. 7, the apparatus of the present invention is capable of performing seven different cooking functions. These will be described in order.

1. Foil Grilling

For quite rapid cooking of steaks (e.g., in 8 to 10 minutes) and the like, the apparatus is utilized as a paper-burning grill. In this instance, the hood assembly 16, the cover 62, and wire grill 60, the briquette basket 58 and the thermal container 35 are removed, and the housing 10 is filled to about the three-quarter level with crumpled newspaper. A suitable metal foil is placed on the lower wire mesh grate 70 of the grill 60 and the food to be cooked is placed on top of this foil and between the grates 68 and 70, as shown in FIG. 1. The newspaper in the paperburning chamber 33 is ignited (e.g., by a match) and the grate 60 with the metal foil and food therein is placed over the top opening 18 of the paper-burning housing 10.

Air to support controlled combustion of the paper in the chamber 33 comes primarily through the slots 34, since the foiled grill 60 effectively closes the top 18 of the housing 10. It has been found that when the apparatus is used for outdoor cooking, wind gusts will affect the ventilation through the slots 34 and hence affect the rate at which the paper in the housing 10 burns. Hence, in windy surroundings, the vent adjusting doors 38 are partially closed to restrict the passage of air through the slots 34. When there is little wind, the doors 38 are moved to open the slots 34 fully. In this manner, controlled combustion of the paper in the chamber 33 is achieved so that a steady heat is supplied through the foil on the grill 60 to cook the food therein in a very short time. One charge of paper (i.e., crumpled newspaper filling the housing 10 to the three-quarters level) will burn at a steady rate for about 12 minutes, which is usually sufficient time to cook a steak.

2. Pan Grilling

In the event it is desired to fry or grill in a pan, (e.g., for bacon and eggs), instead of using the grill 60 with a foil cover, the convertible cover 62 is used as a pan. As described above, burning chamber 33 is filled to the three-quarters level with crumpled newspaper, which is then ignited. The cover 62 is inverted with its rim 78 projecting upwardly so that the cover 62 functions as a pan. With the cover 62 closing the top opening 18 of the housing 10, the slots 34 provide air for controlled combustion of the paper in the chamber 33. Except for a short heat-up time for the cover-pan 62, cooking is almost as rapid as with the foil grilling described above.

3. Baking

When the oven 12 is used for baking, food is placed in the oven chamber 54, the oven door 46 is closed, and successive charges of crumpled newspaper are burned in the combustion chamber 33, first to bring the oven temperature up to a baking level and then to maintain it at this level. It is to be understood, of course, that to maintain controlled combustion of the paper in the chamber 33 the top end 18 of the housing 10 must be substantially closed. Thus, if food is not being cooked on the grill 60 or pancover 62 (which, of course, closes the housing opening 18), then the cover 62 is simply placed on top of the housing 10 to close it, with air for combustion being supplied in a controlled manner through the slots 34. As described above, the slots 34 are adjusted by means of the doors 38 to compensate for gusting wind. Rate of combustion of paper in the chamber 33 also can be controlled by means of the doors 38 so as to regulate the baking temperature. It has been found that sufficient heat is transferred from the combustion chamber 33 through the floor 32 to maintain the oven chamber at about 300° to 400° F. It is to be understood, of course, that another cooking operation (e.g., grilling or frying) could be carried on at the same time that the baking is taking place. In preparing a full meal, the baking operation may be carried on for about 45 minutes to an hour (as in the case of baking potatoes) and near the completion of the baking cycle, meat can be grilled as described above.

4. Warming Oven

To utilize the oven 12 for warming, it is necessary to burn one charge of paper in the burning chamber 33 with the oven door 46 closed to bring the oven chamber 54 up to temperature. After about 10 to 12 minutes (which is the time it takes a charge of crumpled newspaper to burn in a combustion chamber 33) the oven 12 will have reached a temperature of about 250° to 350° F. The food to be kept warm (which may be food which has been grilled by the paper just burned in the chamber 33) is then placed in the oven chamber 54. As subsequent charges of crumpled newspaper are burned in the chamber 33, the desired warming temperature can be maintained in the oven chamber 54 by regulating the oven door 46.

5. Charcoal Broiling

While in the four cooking operations described above the paper-burning housing 10 with crumpled paper fuel is used as the primary heat source, in this and the following two cooking operations to be described, it is used instead as an igniter for charcoal briquettes contained in the basket 58. To accomplish such ignition, first the basket 58 is filled with charcoal briquettes to a depth of perhaps two inches. The basket 58 is then lifted and a small amount of crumpled newspaper is deposited in only the bottom quarter of the container 10 and ignited. The basket 58 with the charcoal briquettes therein is placed back on the container 10 to substantially cover the housing opening 18. With this arrangement there is sufficient ventilation through the slots 34 to support adequate combustion of the paper in the bottom of the container. It has been found that with the combustion chamber 33 only one-quarter filled with crumpled paper there is burning of sufficient intensity to ignite substantially the entire bed of coals in a very short time (e.g., in about 5 minutes).

Then the grill 60 with the food to be broiled (e.g., steak) is placed on top of the housing 10. If the slots 34 are left full open, air is permitted to pass into the chamber 33 below the charcoal briquette bed and cause faster burning of the briquettes. However, by closing the slots 34 by means of the doors 38, the housing 10 then functions as a closure to surround the bottom and sides of the burning charcoal briquette bed to achieve a more conventional slower rate of burning of the briquettes.

6. Rotisserie Charcoal Broiling

For rotisserie charcoal broiling, a bed of charcoal briquettes is ignited in substantially the same manner as described immediately above. Likewise, the rate of burning of the charcoal briquettes can be controlled by means of the vent-adjusting doors 38. Usually, however, the doors 38 will be closed. The hood assembly 16 is placed on top of the housing 10, and the food to be broiled is inserted on the rotisserie 86. The hood opening 84 is ordinarily left open with the hood 80 offering protection against wind gusts and the like.

7. Smoking Food

To smoke food a bed of charcoal briquettes is ignited in the same manner as the two cooking operations described immediately above (i.e., charcoal broiling and rotisserie broiling). However, for smoking food, it is desired to have a slow smoldering burn of the charcoal briquettes. The food to be smoked is placed on one or both of the smoke shelves 94 and 96, and the hood cover 98 is placed over the hood opening 84. Thus, the housing 10 and the hood 80 with the door 98 form a substantially closed smoke chamber. The venting door 38 can be adjusted as desired to permit limited flow of air through the venting slots 34 to support slow combustion of the charcoal briquettes in the basket 58.

To obtain a desired smoked flavor of the food, prior to inserting the hood 80 onto the housing 10, the grill 60 is placed over the briquette bed, and a layer of wood chips is placed on the grill 60. Then the hood 80 with the door 98 is placed on the housing 10 to make the closed smoke chamber. The venting doors 38 are adjusted to the proper degree (perhaps one-quarter open), and a slow smoldering of the charcoal and wood chips is achieved.

While the operation of the apparatus can be understood by the preceding description, it is believed a clearer understanding of the functional relationships of the various physical components of the apparatus of the present invention will be achieved by examining, with reference to FIG. 7, how these various components functionally cooperate to achieve the various cooking operations described above.

1. The Paper-Burning Housing 10

As can be seen in FIG. 7, in the first four cooking operations (i.e., foil grilling, pan grilling, baking and warming) the paper-burning housing 10 is the primary heat source. For the first two operations (foil grilling and pan grilling) generally a single charge of paper (i.e., crumpled newspaper filling three-quarters of the housing 10) will supply a steady source of intense heat for 10 or 12 minutes to accomplish most cooking operations. For the second two operations (baking and warming) a sequence of fuel charges (i.e., crumpled newspaper charges) is required for sustained heat over a longer period of time.

For the last three cooking operations (charcoal broiling, rotisserie broiling and smoking), the housing 10 serves as an igniter for the bed of charcoal briquettes. Thereafter, the housing 10 serves as a support structure and also as a lower closure for the bed of charcoal briquettes which is the primary source of heat.

2. Adjustable Venting Slots 34

The primary function of the adjustable slots 34 with their adjusting doors 38 is for controlled combustion of the paper fuel in the combustion chamber 33. As indicated previously, for combustion to take place in a controlled manner, the open top 18 of the housing 10 is closed, and air circulation is mainly through the slot vents 34. With little or no wind, the slots 34 are left open. For gusting wind, the slots 34 are partially closed by means of the doors 38.

For the last three cooking operations (charcoal broiling, rotisserie broiling and smoking) during the ignition stage (about the first five minutes) the slots 34 are used for providing sufficient venting for proper combustion in the burning chamber 33. Thereafter, the slots 34 are closed by the doors 38 to provide a substantially closed lower container for the charcoal briquettes in the basket 58. However, the slots 34 may be opened selectively (particularly in the case of the smoking of food) to obtain proper rate of combustion.

3. The Grill 60

For foil grilling the grill 60 serves the function of supporting the food to be cooked and also supporting the foil which covers the housing opening 18. In charcoal broiling the grill 60 acts as a food support. For food smoking the grill 60 functions to support the wood chips above the bed of charcoal briquettes.

4. The Charcoal Basket 58

As indicated in FIG. 7, the charcoal basket 58 serves the primary function of carrying the charcoal briquettes for the primary heat source in the three last named cooking operations. After the charcoal briquettes in the basket 58 becomes ignited, then the closed housing 10 serves the additional function of substantially closing the bottom and side portions of the charcoal briquette bed from circulating air current so that the charcoal briquettes burn at a properly controlled rate.

5. Convertible Pan-Cover 62

The pan cover 62 serves, of course, the function of a cover for the housing 10 when the unit is not in use. For pan grilling, cover 62 serves not only as a pan to contain the food, but also closes the top of the housing 10 for proper combustion of the paper in the chamber 33. When the apparatus is used for baking or warming, the cover 62 again is used to close the housing top opening 18 for proper control of combustion of the paper in the chamber 33.

6. The Hood Assembly 16

For rotisserie broiling, the hood assembly 16 serves primarily as a support for the food to be rotisserie broiled. It also provides protection from gusting wind.

When used during the smoking operation, the hood assembly 16 then serves in conjunction with the housing 10 to form a substantially closed smoking chamber, with the hood assembly 16 serving the additional function of a support for the food.

7. The Oven 12

Structurally, the oven base 12 serves the function of providing a base support for the housing 10 so that the cooking accouterments (e.g., the grill 60, the rotisserie 86, etc.) are at more convenient height for handling the food, etc. When the apparatus is being used for either foil grilling or pan grilling, the oven 12 can serve the auxiliary function of a warming oven, with the oven door 46 being used to obtain proper temperature control in the oven. Alternately, the oven can be used in conjunction with the paper-burning housing 10 as a baking oven.

What is claimed is:

1. A portable combination cooking apparatus, comprising:
    a. a housing having substantially closed bottom and side walls and an upper rim defining a substantially open top, said housing defining a burner chamber adapted to burn crumpled newspaper;
    b. said housing having at least one lateral ventilating opening formed therein at a location in the top portion of the housing moderately below the upper rim of the housing, and sized to provide controlled air flow into the combustion chamber of the housing for controlled burning;
    c. a grill removably mounted to the open top portion of the housing;
    d. a removable perforate charcoal briquette containing basket adapted to be mounted in the housing top opening at a location below the grill;
    e. a removable convertible pan-cover mounted over the top of said housing and adapted to be used either as a closure for the housing top opening and/or as a cooking pan;
    f. a removable hood assembly comprising a hood with an access opening, a door to close the opening and means to mount food within said hood, said hood being mounted above said housing; and
    g. an oven base on which said housing is mounted, said oven base defining an oven chamber and wherein the bottom of said housing defines a heat conductive roof separating said oven chamber from the combustion chamber, whereby said oven is heated by heat from the burning chamber of the housing.

2. The apparatus as recited in claim 1, wherein there is adjustable closure means for the ventilating opening whereby the amount of air circulating through said ventilating opening can be controlled.

3. The apparatus as recited in claim 2 wherein there are two generally diametrically opposed ventilating openings, each having a horizontal slot-like configuration, and there are individual adjustable closure means for each of said vents.

4. The apparatus as recited in claim 3, wherein said adjustable closure means comprises a door slide mounted in its respective ventilating opening.

5. A portable combination cooking apparatus, comprising:
    a. a housing having substantially closed bottom and sidewalls defining a burning chamber adapted to burn crumpled paper and having an upper rim at a substantially open top portion of the housing;
    b. said housing having at least one combustion control ventilating opening formed therein at a location in the top portion of the housing moderately below the housing's upper rim, and sized to provide controlled airflow for burning in said chamber;
    c. a food supporting and cooking device removably mounted to the top part of said housing so as to extend over the housing top opening so as to be be able to substantially cover the top opening and be heated from the housing burner chamber;
    d. and oven base below said housing and defining an oven chamber, said housing bottom defining a heat conductive roof separating said oven chamber from the burning chamber so that said oven chamber is heated from the burning chamber.

6. The apparatus as recited in claim 5, wherein said ventilating opening has adjustable closure means, whereby the ventilation through said ventilating opening can be selectively regulated to control rate of burning in the burning chamber.

7. The apparatus as recited in claim 6, wherein the food supporting and cooking device comprises a convertible pan-cover to close the housing top opening for controlled combustion of paper in the burning chamber and to be utilized as a cooking pan.

8. The apparatus as recited in claim 5, wherein there is a perforate basket adapted to contain charcoal briquettes and removably mounted in the housing top opening and there is a removable grill mounted above said basket.

9. The apparatus as recited in claim 5, wherein there are:
    a. adjustable closure means for the ventilating opening to selectively restrict flow through said ventilating opening to control combustion in the burning chamber;
    b. a convertible pan-cover as part of said food supporting and cooking device removably mounted to the top of the housing so as to close the top of the housing for controlled combustion in the burning chamber, and adapted to be utilized as a cooking pan;
    c. a removable perforate charcoal briquette-containing basket adapted to be mounted in said container top opening below the grill; and
    d. a removable grill as part of said food supporting and cooking device mounted above said basket.

10. A portable combination cooking apparatus, comprising:
    a. a housing having substantially closed bottom and sidewalls defining a burning chamber adapted to burn crumpled newspaper and having an upper rim at a substantially open top portion of the housing;
    b. said housing having at least one combustion control ventilating opening formed therein at a location in the top portion of the housing moderately below the housing's upper rim, and sized to provide controlled air flow for burning in said chamber;
    c. a removable perforate charcoal briquette containing basket adapted to be mounted in the top opening of the housing, said basket having a perforate bottom with openings sufficiently small to prevent burning charcoal briquettes from dropping therethrough, and sufficiently large to permit flames from the combustion chamber to pass through the perforations to ignite charcoal briquettes in the basket; and
    d. said charcoal briquette basket being above a bottom edge of said ventilating opening whereby ventilating air from said opening is able to support combustion of paper in said chamber to ignite said charcoal briquettes.

11. The apparatus as recited in claim 10, wherein there is a grill removably mounted to the top portion of the housing above the basket.

12. The apparatus as recited in claim 10, wherein there is an oven base which defines an oven chamber and on which said housing is mounted, said housing bottom defining a top heat-conducting cover by which said oven is separated from the burning chamber of the housing, whereby said burning chamber heats said oven.

13. The apparatus as recited in claim 10, wherein there is adjustable closure means for the ventilating opening, whereby the amount of air circulating through said ventilating opening can be controlled.

14. The apparatus as recited in claim 10, wherein there is a removable hood assembly mounted above said housing, said hood assembly comprising a hood with an access opening, a door to close the opening and means to mount food to be cooked within said hood, whereby said hood with its door is able to form with said housing a substantially closed chamber for the smoking of food therein.

15. The apparatus as recited in claim 14, wherein there is adjustable closure means for the ventilating opening, whereby the amount of air circulating through said ventilating opening to supply air for the combustion of charcoal briquettes in the basket can be selectively controlled to accomplish a smoldering burn of said briquettes for smoking of food.

16. The apparatus as recited in claim 15, wherein there are two generally diametrically opposed ventilating openings, each having a horizontal slot-like configuration, and there are individual adjustable closure doors for each of said openings.

17. The apparatus as recited in claim 14, wherein there is a removable grill mounted to the top of said housing above said basket, which grill is adapted to carry wood chips for food smoking.

* * * * *